United States Patent [19]

Osman

[11] 4,453,251

[45] Jun. 5, 1984

[54] ERROR-CORRECTING MEMORY WITH LOW STORAGE OVERHEAD AND FAST CORRECTION MECHANISM

[75] Inventor: Fazil I. Osman, San Diego, Calif.

[73] Assignee: Burroughs Corporation, Detroit, Mich.

[21] Appl. No.: 310,461

[22] Filed: Oct. 13, 1981

[51] Int. Cl.³ .................. G06F 11/10; G11C 29/00
[52] U.S. Cl. ................................ 371/51; 371/38; 371/50
[58] Field of Search ............... 371/51, 49, 50, 37, 371/38

[56] References Cited

U.S. PATENT DOCUMENTS

| Re. 23,601 | 12/1952 | Hamming et al. | 371/37 |
|---|---|---|---|
| 3,037,697 | 6/1962 | Kahn | 371/50 |
| 3,876,978 | 4/1975 | Bossen et al. | 371/51 |
| 4,103,823 | 8/1978 | Aichelmann, Jr. et al. | 371/51 |
| 4,335,460 | 6/1982 | Bolcavage et al. | 371/49 |

Primary Examiner—Charles E. Atkinson
Attorney, Agent, or Firm—Charles J. Fassbender; Kevin R. Peterson

[57] ABSTRACT

In the disclosed error-correcting memory, data bits are stored in a plurality of memory arrays. Each of said arrays have their memory cells arranged in rows and columns, and a word of said data bits is read by simultaneously selecting one cell at any one row-column pair in every array of said plurality. Every row of each array of said plurality includes a means for storing at least one code bit computed from the data bits in the corresponding row. A plurality of checking means respectively coupled to said plurality of arrays for receiving and checking all of the data bits and code bits in the row in its corresponding array from which said one cell is selected to form said word. And an additional memory array means contains memory cells arranged in rows and columns for storing a parity bit at each row-column pair computed from the word of data bits in said plurality of arrays at the corresponding row-column pair.

9 Claims, 7 Drawing Figures

FIG.1. Prior Art

| DATA BITS/WD | CHECK BITS/WD | OVERHEAD |
|---|---|---|
| 2 | 3 | 5/2 = 2.500 |
| 4 | 4 | 8/4 = 2.000 |
| 8 | 5 | 13/8 = 1.625 |
| 16 | 6 | 22/16 = 1.375 |
| 32 | 7 | 39/32 = 1.219 |

ERROR-CORRECTING MEMORY WITH LOW STORAGE OVERHEAD AND FAST CORRECTION MECHANISM

BACKGROUND OF THE INVENTION

This invention relates to digital memories; and more particularly, it relates to those digital memories that have error-correcting capability.

In the prior art, a wide variety of digital memories exist. They include dynamic RAMs (DRAMs), static RAMs (SRAMs), electrically programmable read-only memories (EPROMs), and mask programmable read-only memories (ROMs). These memories are described, for example, in a book entitled *The MOS Memory Data Book for Design Engineers*, Texas Instruments, 1980.

Ideally, all of these memories operate to store digital data bits which are read from the memory as the data is needed. However, all of these memories are also susceptible to errors which cause the data that is read from the memory to be different than the data that was stored (or was intended to be stored) in the memory.

Any one of a wide variety of failure mechanisms may cause these errors. For example, in a dynamic RAM, irradiation in the form of alpha particles can destroy the data bits in one of the memory's cells. As another example, in a mask programmable read-only memory, a minor defect in the mask that programs the memory can cause erroneous data to be permanently written into a cell.

Thus, various structures have been devised in the prior art to detect and correct memory errors. One of these structures involves the encoding of each word of data in a Hamming code and the storing of those encoded words in the memory. Thereafter, when a data word is read, the Hamming code is checked to see if it is a valid code; and if it is not, the bit in error is corrected according to the Hamming error-correction procedure.

However, the Hamming approach is unattractive because it requires the memory's storage capacity to be greatly increased in order to accommodate the data bits plus the code bits. This is evident by inspection of FIG. 1 wherein the leftmost column lists the number of data bits per word; the middle column lists the corresponding number of Hamming check bits per word that are required to detect and correct a single bit error; and the rightmost column lists the corresponding overhead or increase in memory storage capacity.

As the rightmost column shows, this overhead for commonly used word lengths of eight bits and sixteen bits respectively is 62.5% and 37.5%. This can be verified, for example, by the discussions at page 321 of a book, *Digital Computer System Principles*, Herbert Hellerman, 1967.

Another mechanism for detecting and correcting memory errors, and which requires less memory overhead than the Hamming code approach, is described in a recent article, "Low Cost Alternative to Hamming Code Corrects Memory Errors", Lee Edwards, *Computer Design*, July, 1981, pp. 143–148.

Figure 2:
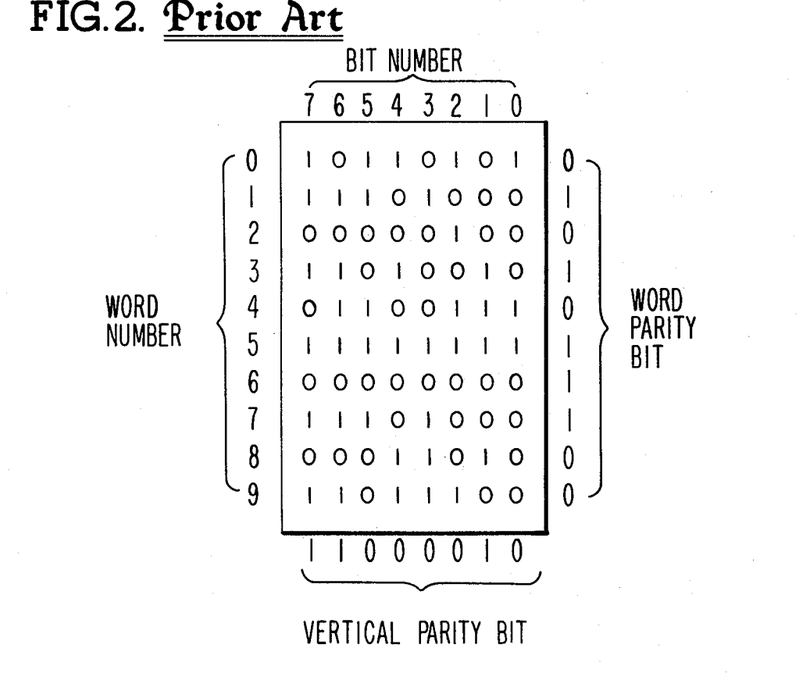
FIG. 2 illustrates for comparison purposes the arrangement of data bits, word parity bits, and vertical parity bits in another error-correcting memory of the prior art.

There the memory is divided into blocks as illustrated herein as FIG. 2. Each block contains several data words. Associated with each data word in the block is a word parity bit. And associated with all of the data words in a block is one word of vertical parity bits.

Inspection of FIG. 2 shows that the memory overhead which the Edwards mechanism requires is in fact reduced in comparison to the Hamming mechanism. However, the Edwards mechanism presents the new problem of being too slow in its error-correcting procedure.

When a data word is read from an Edwards memory block, the parity bit associated with that word is checked. Then if that check indicates the word is in error, the device which read the word (e.g., a computer) traps to an error routine to sequentially read all of the other words in the block.

This reading of all of the words in the block is a very time-consuming operation. But those words must be read so that the vertical parity word of the block can be recalculated. This recalculated vertical parity word is then compared with the stored vertical parity word to determine which bit in the original fetched data word is in error.

Suppose, for example, that each block had 2,048 words as Edwards suggests in his paper at page 145, and the access time per word of data in one block was 100 nanoseconds. Then, to correct an error would take 2,048 times 100 nanoseconds or 204 microseconds, plus the time needed to recalculate the vertical parity bits.

Of course, the error-correcting time in the Edwards mechanism can be reduced by decreasing the number of words per block. However, as the number of words per block decreases, the ratio of parity bits to data bits per block increases. So in other words, the memory overhead goes up.

Accordingly, it is a primary object of this invention to provide an improved error-correcting memory.

Another object of this invention is to provide an error-correcting memory which requires relatively few check bits and also corrects errors relatively quickly.

BRIEF SUMMARY OF THE INVENTION

These and other objects are accomplished in accordance with the invention by an improved error-correcting memory comprised of a plurality of memory arrays with each of the arrays containing memory cells arranged in rows and columns for storing data bits, and a means for reading a word of those data bits by simultaneously selecting one cell at any one row-column pair in each array of the plurality.

In one embodiment of the invention, the improvement comprises an additional memory cell means in every row of each array of said plurality for storing parity bits computed from the data bits in the corresponding rows of said arrays; and an additional memory array means containing memory cells arranged in rows and columns for storing a parity bit at each row-column pair computed from the word of data bits in said plurality of arrays at the corresponding row-column pair.

In another embodiment, the improvement comprises a storage means in every row of each array of said plurality for storing at least one code bit computed from the data bits in the corresponding row; and a plurality of checking means respectively coupled to said plurality of arrays, with each of said checking means receiving and checking all of the data bits and code bits in the row of its corresponding array from which said one cell is selected to form said word.

BRIEF DESCRIPTION OF THE DRAWINGS

Various features and advantages of the invention are described in the following Detailed Description in conjunction with the accompanying drawings wherein.

DETAILED DESCRIPTION OF THE INVENTION

Figure 3:
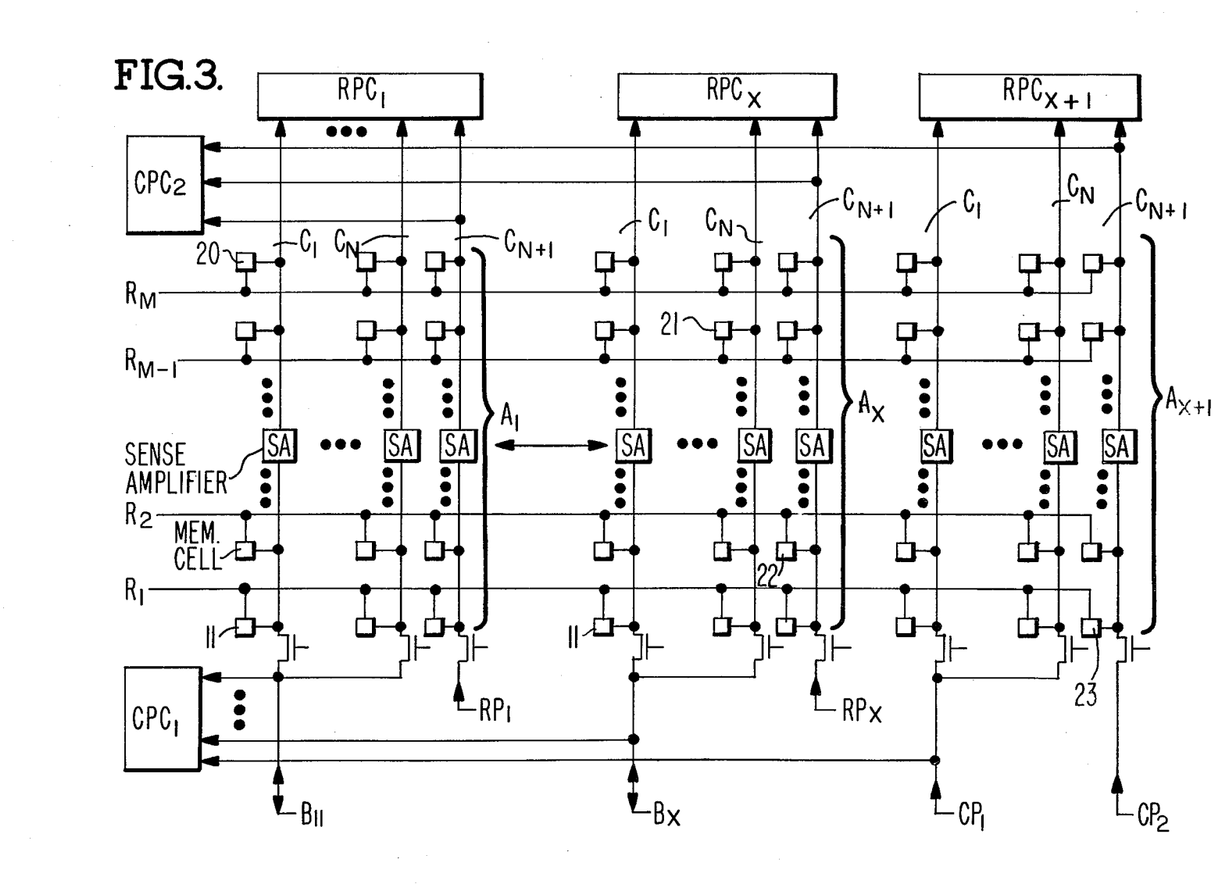
FIG. 3 illustrates an organization of memory cells and accompanying parity-checking logic circuits in one preferred embodiment of the present invention.

Referring now to FIGS. 3 and 4, one preferred embodiment of the invention will be described in detail. In general, FIG. 3 illustrates this embodiment's organization of memory cells and its accompanying parity-checking logic circuits; whereas FIG. 4 illustrates the embodiment's error-correcting and parity-generating logic circuits.

In FIG. 3, all of the memory cells are arranged in arrays $A_1$ through $A_{X+1}$, where "X" is the number of bits per data word. That is, when the memory is read, a data word of X bits in length is retrieved; and when the memory is written, a data word of X bits in length is stored; but the number of arrays in the entire memory is $X+1$.

Memory cells within each array are arranged in M rows and $N+1$ columns. Row 1 is designated $R_1$; row 2 is designated $R_2$; . . . , and row M is designated $R_M$. Similarly, column 1 is designated $C_1$; . . . column $N+1$ is designated $C_{N+1}$. One memory cell exists at the intersection of each row-column pair.

Some of the memory cells in the arrays store data bits while other cells store parity bits. In particular, data bits are stored in all of the memory cells that lie in columns $C_1$ through $C_N$ in arrays $A_1$ through $A_X$. And parity bits are stored in all of the remaining memory cells. That is, parity bits are stored in column $N+1$ of arrays $A_1$ through $A_X$, and in all of the memory cells of array $A_{X+1}$.

Each parity bit in a particular row of array $A_1$ is generated from the data bits in that same row. For example, the parity bit at row $R_1$, column $C_{N+1}$ in array $A_1$ is generated from all of the data bits in row $R_1$ of that same array. Similarly, the parity bit at row $R_2$, column $C_{N+1}$ in array $A_1$ is generated from all of the data bits in row $R_2$ of that array.

Parity bits in column $C_{N+1}$ for all of the other arrays except array $A_{X+1}$ are generated in the same fashion. Thus, for example, the parity bit in row $R_1$, column $C_{N+1}$ of array $A_X$ is generated from all of the data bits in row $R_1$ of array $A_X$.

To read a word of data from this embodiment, a memory cell at one row-column pair in each of the memory arrays is selected. For example, the data word that is stored in the memory cells indicated by reference numeral 11 in FIG. 3 is read by selecting row 1 and column 1 in each of the arrays.

Each of the parity bits in rows $R_1$ through $R_M$ and columns $C_1$ through $C_N$ of array $A_{X+1}$ is generated from the data word at the corresponding row-column pair in the other arrays $A_1$ through $A_X$. For example, the parity bit at row $R_1$ column $C_1$ of array $A_{X+1}$ is generated from the data word at row $R_1$ column $C_1$ of all of the arrays $A_1$ through $A_X$. Similarly, the parity bit in array $A_{X+1}$ at row $R_2$ column $C_N$ is generated from the data word at row $R_2$ column $C_N$ in arrays $A_1$ through $A_X$.

Parity bits in column $C_{N+1}$ of array $A_{X+1}$ are generated from the parity bits in column $C_{N+1}$ of all of the other arrays $A_1$ through $A_X$. For example, the parity bit in row $R_1$ column $C_{N+1}$ of array $A_{X+1}$ is generated from the parity bits in row $R_1$ column $C_{N+1}$ of all the arrays $A_1$ through $A_X$.

Accompanying these $X+1$ arrays of memory cells are $X+1$ row-parity checkers. They are indicated in FIG. 3 as $RPC_1$ through $RPC_{X+1}$. Checker $RPC_1$ checks the row parity in array $A_1$; . . . checker $RPC_X$ checks the row parity in array $A_X$; and checker $RPC_{X+1}$ checks the row parity in array $A_{X+1}$.

Also in FIG. 3 are two column-parity checkers; and they are indicated as $CPC_1$ and $CPC_2$. Checker $CPC_1$ checks the parity in the data word that is read from arrays $A_1$ through $A_X$. And checker $CPC_2$ checks the parity in columns $C_{N+1}$ of all the arrays $A_1$ through $A_{X+1}$.

Consider now how the above checkers are used to determine if a particular bit is in error. Suppose, for example, that the data bit in array $A_1$, as indicated by reference numeral 20 is in error. Then, when that bit is read as part of a data word, checker $RPC_1$ will detect an error and checker $CPC_1$ will also detect an error. This combination indicates that data bit $B_1$ in the read data word is in error.

As another example, suppose that the data bit in array $A_X$ as indicated by reference numeral 21 is in error. Then, when the data word which includes that bit is read from arrays $A_1$ through $A_X$, checkers $RPC_X$ and $CPC_1$ will simultaneously detect an error. That combination indicates that bit $B_X$ in the retrieved data word is in error.

As still another example, suppose that the parity bit in cell 22 of array $A_X$ is in error. Then, when any word in row 2 is read from memory arrays $A_1$ through $A_X$, checkers $RPC_X$ and $CPC_1$ simultaneously detect an error. This combination indicates that the parity bit read from columns $C_1-C_N$ of array $A_{X+1}$ is incorrect.

As a further example, suppose that the parity bit in memory cell 23 in array $A_{X+1}$ is in error. Then, when any data word is read from row 1 in arrays $A_1$ through $A_X$, checkers $RPC_{X+1}$ and $CPC_2$ simultaneously detect an error. This combination indicates that the parity bit read from column $C_{N+1}$ in array $A_{X+1}$ is in error.

Figure 4A:
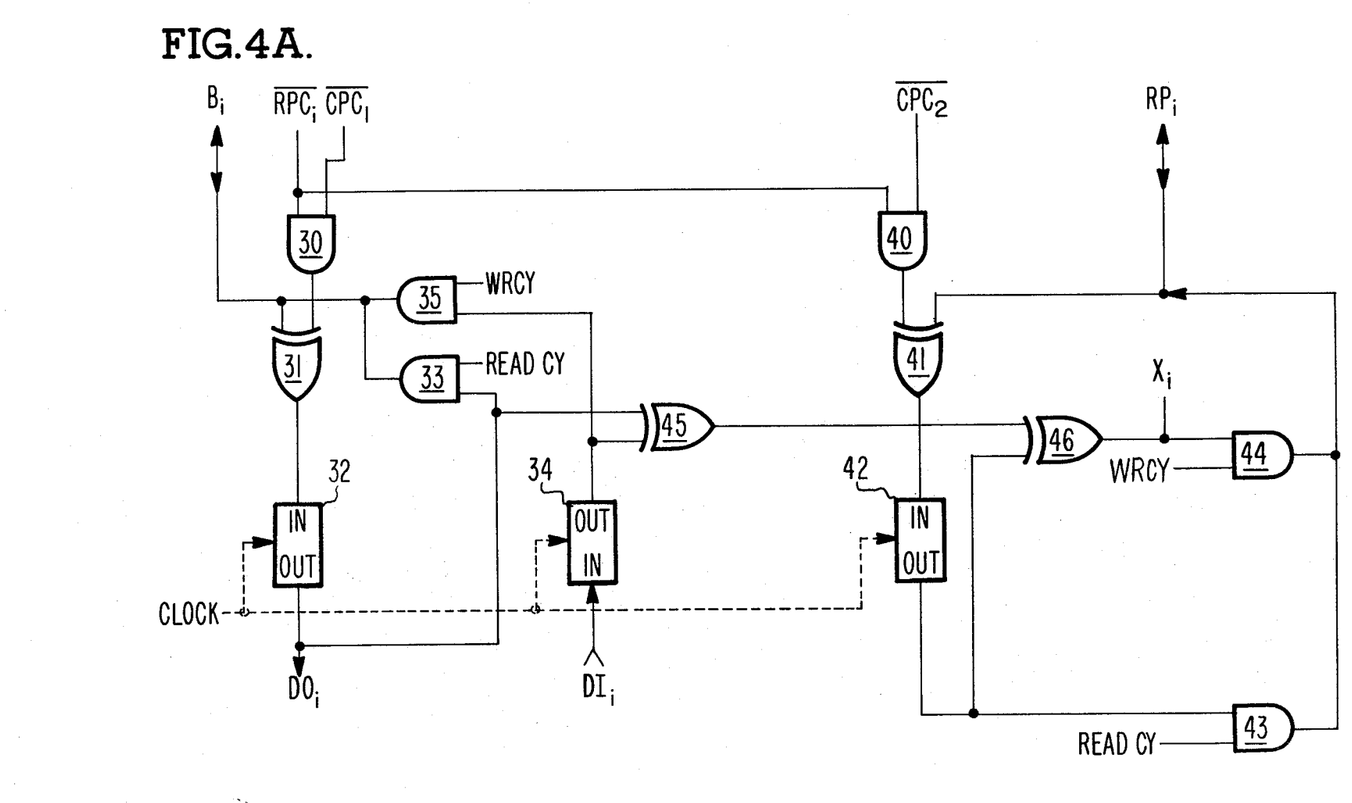
FIG. 4 illustrates error-correcting and parity-generating logic circuits that accompany the embodiment of FIG. 3.

Turning now to FIG. 4, the detailed logic circuits for carrying out the above error detection, plus the accompanying error-correction operation, is illustrated. All of the logic in FIG. 4A is repeated once for each of arrays $A_1$ through $A_X$. Signal names in that logic have a subscript "i"; and "i" equals 1 when that logic is utilized in conjunction with array $A_1$, "i" equals 2 when that logic is utilized with the next array $A_2$; etc. up to "i" equals "X".

To understand how the FIG. 4A logic operates, suppose that the ith bit $B_i$ in the data word that is read from arrays $A_1$ through $A_X$ is in error. In that event, the ith row parity check ($RPC_i$) and column parity check 1

(CPC$_1$) simultaneously detect an error. Thus, the output of AND gate 30 will be true.

That output goes to the input of an exclusive OR gate 31; and the other input to that exclusive OR gate is the ith bit of the data word B$_i$ that is being read. So if an error is detected by AND gate 30, then exclusive OR gate 31 operates to invert data bit B$_i$; whereas if the output of AND gate 30 is false, then bit B$_i$ passes directly through gate 31.

Gate 31 has its output latched in a flip-flop 32. That flip-flop is clocked by a timing signal which is generated by conventional timing circuits internal to the memory. An output from flip-flop 32 is the ith data out bit from the memory. This is the ith bit in the data word that is sent to the memory user.

That bit is also sent internally in the memory to an AND gate 33. Then it passes through AND gate 33 if the data word was retrieved from the memory in response to a read command. Gate 33 has its output connected to regenerate the ith bit in memory array A$_i$; so a corrected bit is thus restored back in array A$_i$ if the initially read bit B$_i$ was in error.

If, however, a new data word from an external source is being written into the memory, then the ith bit of that data word is stored in another flip-flop 34. And the output of flip-flop 34 passes through an AND gate 35 whereupon it becomes bit B$_i$ for storage in the ith memory array A$_i$.

All of the remaining portion of the FIG. 4A logic is utilized to correct and generate a parity bit in column C$_{N+1}$ of array A$_i$. If that parity bit is read from the array in error, then that is detected by the simultaneous occurrence of a parity error in CPC$_2$ and RPC$_i$. This event is detected by an AND gate 40.

Gate 40 has its output connected to an exclusive OR gate 41; and gate 41 also receives row parity bit RP$_i$ from column C$_{N+1}$ in the ith array. Thus, row parity bit RP$_i$ is inverted if it is in error; and it is not inverted if it is not in error. This result is then stored in a flip-flop 42.

Flip-flop 42 has its output passed through an AND gate 43. And the output of gate 43 is written back into memory array A$_i$ if a read command is being performed. Conversely, if a new data word from an external source is being written into the memory, then the output of an AND gate 44 becomes the new parity bit for array A$_i$.

That parity bit from gate 44 is formed by exclusive ORing via a gate 45 the read data bit in flip-flop 32 with the new data bit in flip-flop 34. Then the output of gate 45 is exclusive ORed with the read parity bit in flip-flop 42. By this mechanism, parity bit RP$_i$ is inverted if the read data bit DO$_i$ and the new data bit to be written DI$_i$ are different from each other.

Figure 4B:
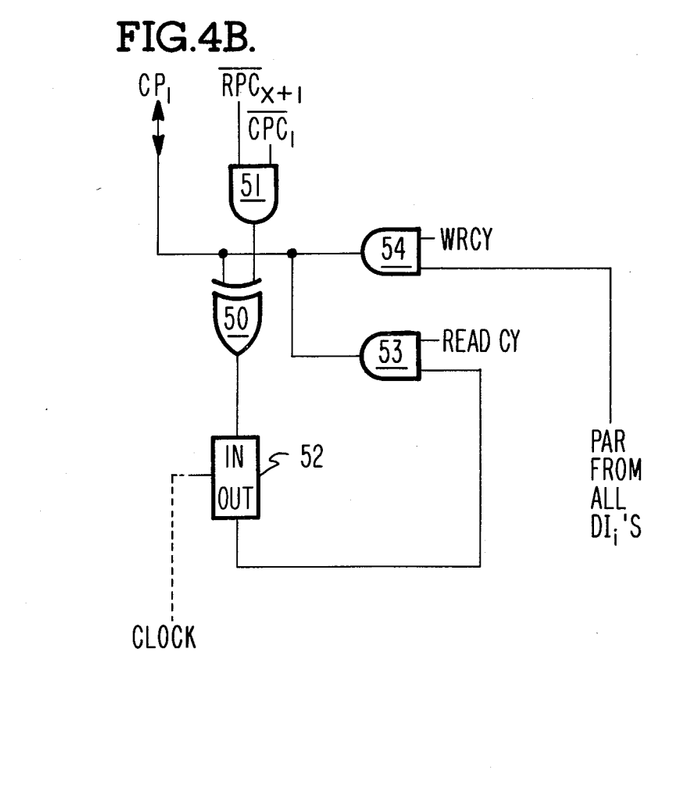

Consider now the logic of FIG. 4B. It operates to correct and generate parity bits for columns C$_1$ through C$_N$ of array A$_{X+1}$. During a read operation, the parity bit that is selected from one of the columns C$_1$ through C$_N$ of array A$_{X+1}$ is indicated as CP$_1$. That parity bit is sent to an exclusive OR gate 50.

When that bit is in error, checker RPC$_{X+1}$ and checker CPC$_1$ both detect incorrect parity. This occurrence is detected by AND gate 51.

Gate 51 has its output sent to an exclusive OR gate 50 along with parity bit CP$_1$. Thus, when the output of AND gate 51 is true, parity bit CP$_1$ is inverted; and when the output of AND gate 51 is false, parity bit CP$_1$ is not inverted.

A flip-flop 52 latches the output of exclusive OR gate 50. And that flip-flop has its output sent through an AND gate 53 as the parity bit CP$_1$ to be restored in array A$_{X+1}$ when the memory is performing a read. Alternatively, when the memory is performing a write, an entirely new parity bit is generated from the data word in all of the flip-flops 34 for arrays A$_1$ through A$_X$; and that parity bit is sent to array A$_{X+1}$ through an AND gate 54.

Figure 4C:
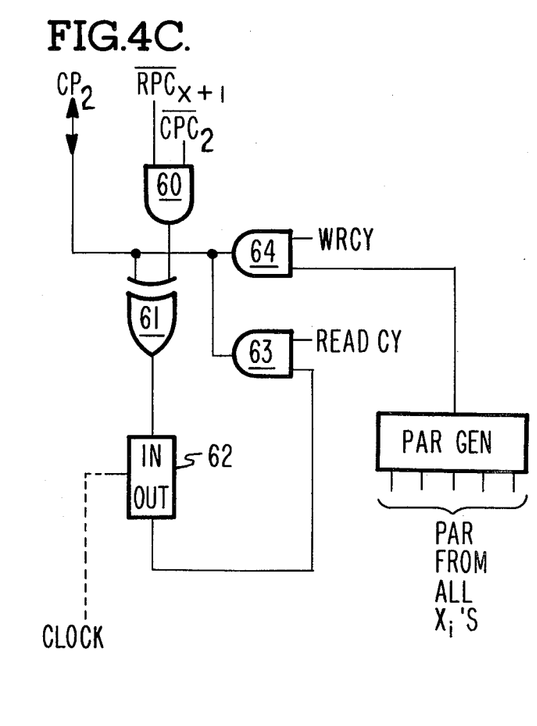

Next, considering FIG. 4C, it illustrates the logic that generates parity bit CP$_2$. If that parity bit is stored in array A$_{X+1}$ in error, then both checker RPC$_{X+1}$ and CPC$_2$ detect an error. This condition is detected by an AND gate 60. Gate 60 has its output sent to an exclusive OR gate 61; and that exclusive OR gate also receives parity bit CP$_2$. Thus, parity bit CP$_2$ is inverted or not inverted depending upon whether it is read from array A$_{X+1}$ in error.

A flip-flop 62 stores the output of exclusive OR gate 61; and that flip-flop has its output sent through an AND gate 63 during a read to be restored in array A$_{X+1}$. Conversely, during a write operation, parity is generated from the output of all the exclusive OR gates 46 for arrays A$_1$ through A$_{X_i}$ and that result is sent through an AND gate 64 for storage in array A$_{X+1}$ as the new parity bit CP$_2$.

From the above, it is evident that an error in the data word B$_1$—B$_X$ can be detected and corrected relatively quickly. In particular, the time to detect and correct an error in bit B$_i$ is the delay through checkers RPC$_1$ and CPC$_1$ which operate in parallel, plus the delay through logic gates 30 and 31 and flip-flop 32. This certainly is much faster than the time that it takes to detect and correct an error via a mechanism which requires multiple data words to be read from a memory, such as the Edwards mechanism of FIG. 2A, for example.

Figure 5:
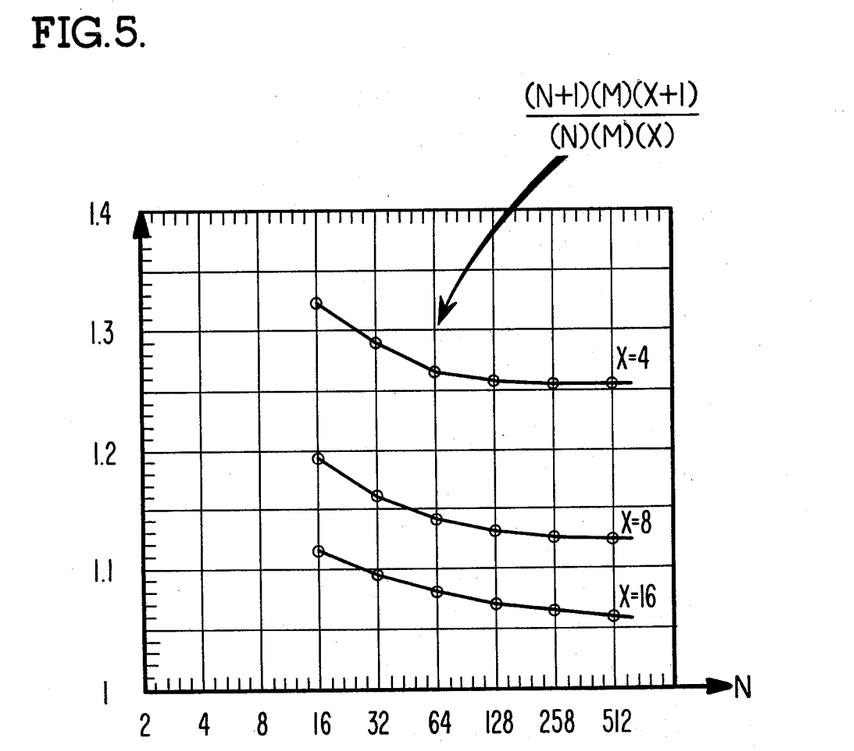
FIG. 5 is a set of curves illustrating the memory overhead in the embodiment of FIG. 3.

Also from the above, it is evident that the memory overhead in this invention is relatively small. This is made even more clear in FIG. 5 wherein the memory overhead is plotted as a function of "N" (the number of columns per array containing data bits) and a function of "X" (the number of data bits per word).

For this invention, overhead can be expressed mathematically as $$\frac{(N+1)(M)(X+1)}{(N)(M)(X)}.$$

In this expression, the denominator equals the number of memory cells that store data bits, and the numerator equals the number of memory dells that store data bits plus the number that store parity bits.

As a specific example, consider a memory that stores 65,536 data bits and has eight data bits per word. With such a memory, "X" equals eight; and each of the "X+1" arrays would have 128 columns and 64 rows. In other words the number of columns "N" per array would be 128; and so the memory overhead from FIG. 5 would be only 1.13. By comparison, the corresponding overhead required in the Hamming type error-correcting memory can be taken from FIG. 1 as 1.625.

Figure 1:
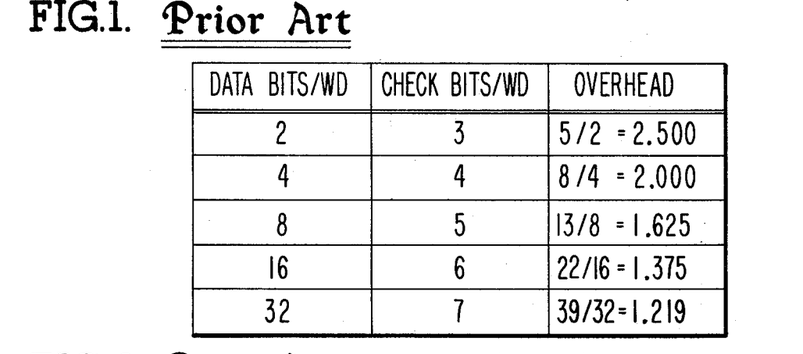
FIG. 1 illustrates for comparison purposes the memory overhead in an error-correcting memory of the prior art where data words are encoded with a Hamming code.
Figure 6:
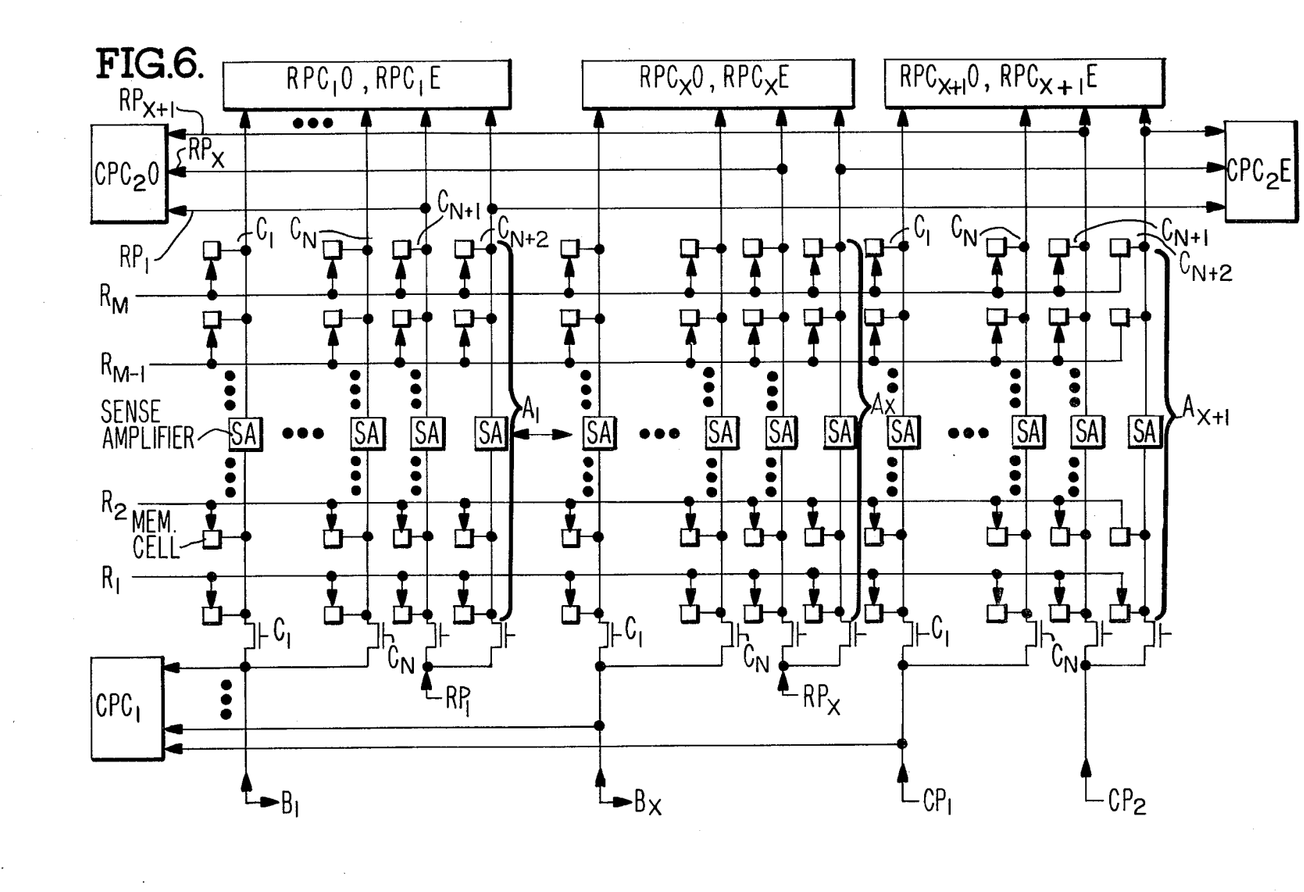
FIG. 6 illustrates an organization of memory cells and its accompanying parity-checking logic circuits in another preferred embodiment of the invention.

As another example, suppose the memory stores 65,536 data bits and has 16 bits per word. In such a memory, there would be X+1 or 17 arrays; and each array could have 64 rows and 64 columns. So N equals 64; and the memory overhead from FIG. 6 is 1.09. By comparison, FIG. 1 shows that the corresponding memory overhead for a Hamming type error-correcting memory is 1.375.

One preferred embodiment of the invention has now been described in detail with respect to FIGS. 3 and 4. But in addition, many changes and modifications can be made to that embodiment without departing from the nature and spirit of the invention. Some of these modifications will now be described.

As one variation, all of the circuitry in FIGS. 3 and 4 may be packaged on a single semiconductor chip. In that case, the error-detecting and the error-correcting operations that the memory performs are transparent to the memory user. In other words the only signals which would be sent to and received from the memory chip would be data signals $DO_i$ and $DI_i$ along with conventional addressing signals, power supply signals, and a read/write command signal.

As another variation, the memory cells in arrays $A_1$ through $A_{X+1}$ may be of the type that are used in dynamic RAMs, or static RAMs, or electrically programmable read-only memories, or mask programmable read-only memories. What is important in this invention is the overall memory organization and not the detailed structure of the individual memory cells.

In view of the above, it should be understood that this invention provides an alternative to memory chips which incorporate redundant data cells. In such a memory, redundant or spare memory cells for storing data bits are constructed on the chip; and those spare memory cells are selectively addressed when a normal memory cell is found to be defective. This selective addressing is implemented by cutting particular address lines by laser beams or current pulses during the chip's fabrication process. But with the error-correcting memory of FIGS. 3 and 4, no such address modifications are required.

Also, when redundancy is used in a mask-programmable read-only memory, not only does the data cell addressing need to be modified to address spare memory cells; but in addition, the spare memory cells need to somehow be programmed in accordance with the customer's personalized and often proprietary data pattern. This latter requirement has in the past required that all of the data cells be duplicated with 100% redundancy. See, for example, the article "Redundancy, What To Do When the Bits Go out", by John G. Poza, *Electronics*, July 28, 1981, pp. 117–119. By comparison, as illustrated herein in FIG. 5, the memory overhead in this invention is substantially less than 100%.

As still another variation to the embodiment of FIGS. 3 and 4, logic gates could be added to detect when an uncorrectable error occurs. To that end, each of the logic gates 30, 40, 51, and 60 would be expanded to include an extra input. That input would carry a signal whose true state indicates that none of the checkers other than the two being specifically ANDed by those gates detected an error.

For example, the signal on the extra input to gate 30 would be true only when column parity checker $CPC_2$ did not detect an error and all of the row parity checks except the ith row parity checker also did not detect an error. Similarly, the extra input to logic gate 51 would be true only when column parity checker $CPC_2$ did not detect an error and all of the row parity checkers $RPC_1$ through $RPC_X$ did not detect an error.

Each of the outputs from these modified logic gates 30, 40, 51 and 60 would then be logically ORed together by an OR gate. This OR gate would also receive another signal indicating that no errors at all were detected. That is, this extra OR gate input would be true when none of the checkers $CPC_1$, $CPC_2$, and $RPC_1$ through $RPC_{X+1}$ detected an error.

Thus, the output from this logical OR gate would be true whenever either no bit was in error or only a single bit was in error. So a false output from this OR gate would indicate that a noncorrectable error occurred. This output could be monitored by the memory's user; and if all of the memory's circuitry were packaged on a single semiconductor chip, this OR gate output would be sent off of the chip so it could be monitored.

Turning now to FIG. 6, still another embodiment of the invention will be described in detail. This embodiment is similar to that of FIGS. 3 and 4; however, it is able to detect and correct double-bit errors in adjacent memory cells on the same row. This capability is most desirable, for example, in a dynamic RAM which is susceptible to alpha particle radiation because there, when an alpha particle causes an error, the error is most likely to occur in only one memory cell or in two adjacent memory cells.

Included in the FIG. 6 embodiment are "X+1" arrays of memory cells which are again labeled $A_1$ through $A_{X+1}$. Also, all of the memory cells in each of those arrays are arranged in M rows (labeled $R_1$ through $R_M$) and N+2 columns (labeled $C_1$ through $C_{N+2}$).

Data bits are stored in the memory cells at columns $C_1$ through $C_N$ in arrays $A_1$ through $A_X$. And parity bits are stored in the remaining memory cells. Thus, each of the arrays $A_1$ through $A_X$ contains two columns of memory cells $C_{N+1}$ and $C_{N+2}$ for storing parity bits; and array $A_{X+1}$ stores parity bits in all of its memory cells.

Parity for the data bits in the odd numbered columns are stored in column $C_{N+1}$; whereas parity for the data bits in the even numbered columns are stored in column $C_{N+2}$. For example, the memory cell at $R_1$-$C_{N+1}$ in array $A_1$ stores parity for the data bits in $R_1$-$C_1$, $R_1$-$C_3$, $R_1$-$C_5$, . . . of array $A_1$. Similarly, the memory cell at $R_1$-$C_{N+2}$ of array $A_1$ stores parity for the data bits in $R_1$-$C_2$, $R_1$-$C_4$, $R_1$-$C_6$, . . . of array $A_1$.

Also included in the FIG. 6 embodiment are a plurality of parity checkers $RPC_1O$, $RPC_1E$, . . . $RPC_{X+1}O$, $RPC_{X+1}E$. Checker $RPC_1O$ checks the parity in column $C_{N+1}$ with the data bits from the odd numbered columns on the selected row in array $A_1$; and checker $RPC_1E$ checks parity in column $C_{N+2}$ with the data bits in the even numbered columns of the selected row in array $A_1$. All of the other row parity checkers operate in a similar fashion with their respective arrays.

Parity bits in rows $R_1$ through $R_M$ and columns $C_1$ through $C_N$ of array $A_{X+1}$ are generated from the data word $B_1$-$B_X$ in arrays $A_1$-$A_X$. For example, the parity bit at row 1 column 1 of array $A_{X+1}$ is generated from the data word in row 1 column 1 of all of the arrays $A_1$-$A_X$. This parity bit is checked against the corresponding data bits $B_1$-$B_X$ by a checker $CPC_1$.

Also in array $A_{X+1}$, the parity bits stored in column $C_{N+1}$ are generated from the parity bits in column $C_{N+1}$ in all of the other arrays $A_1$-$A_X$. For example, the parity bit in row 1 column $C_{N+1}$ of array $A_{X+1}$ is generated from the parity bits in row 1 column $C_{N+1}$ of all of the arrays $A_1$-$A_X$. These parity bits are checked by a parity checker $CPC_2O$ when a data word having bits stored at odd numbered columns is read from the arrays $A_1$-$A_X$.

Similarly, the parity bits stored in column $C_{N+2}$ of array $A_{X+1}$ are generated from the parity bits stored in column $C_{N+2}$ of all of the arrays $A_1$-$A_X$. Those parity bits are checked by a parity checker $CPC_2E$ when a data word having bits stored at even numbered columns is read from the arrays $A_1$-$A_X$.

Consider now how double-bit errors in two adjacent data bits on any one row of the FIG. 6 embodiment are detected and corrected. Suppose, for example, that the data bits in row 1 column 1 and row 1 column 2 of array $A_1$ are in error. Then, when the data word at row 1 column 1 of all of the arrays $A_1$-$A_X$ is read, checkers $CPC_1$ and $RPC_1O$ both detect an error.

Of course, the FIG. 6 embodiment also detects and corrects errors in two adjacent data bits on the same column, just as did the FIG. 3 embodiment. Suppose, for example, that the data bits in row 1 column 1 and row 2 column 1 of array $A_1$ are in error. Then, when the data word at row 1 column 1 of all of the arrays $A_1$-$A_X$ is read, checkers $CPC_1$ and $CPC_1O$ both detect an error. And when the data word at row 2 column 1 of all of the arrays $A_1$-$A_X$ is read, checkers $CPC_1$ and $RPC_1O$ again both detect an error.

Suppose now that a double-bit error occurs in two adjacent parity bits. More specifically, suppose the parity bits in row 2 column $C_{N+1}$ and row 2 column $C_{N+2}$ of array $A_1$ are in error. Then, when a data word is read from row 2 and any odd numbered column from arrays $A_1$-$A_X$, the erroneous parity bit in row 2 column $C_{N+1}$ of array $A_1$ will be detected by checkers $RPC_1O$ and $CPC_2O$. Similarly, when a data word is read from row 2 and any of the even numbered columns in arrays $A_1$-$A_X$, the erroneous parity bit at row 2 column $C_{N+2}$ of array $A_1$ will be detected by checkers $RPC_1E$ and $CPC_2O$.

Finally, suppose that two adjacent word parity bits in one row of array $A_{X+1}$ are in error. For example, suppose the parity bits in row 1 columns 1 and 2 in array $A_{X+1}$ are in error. Then, when the word at row 1 column 1 of all of the arrays $A_1$-$A_X$ is read, the error in the parity bit at row 1 column 1 in array $A_{X+1}$ will be detected by checkers $CPC_1$ and $RPC_{X+1}O$. Similarly, when the word at row 1 column 2 of all of the arrays $A_1$-$A_X$ is read, the parity error at row 1 column 2 of array $A_{X+1}$ will be detected by checkers $CPC_1$ and $RPC_{X+1}E$.

All of the errors described above in conjunction with FIG. 6 are corrected by logic circuitry similar to the errors previously described in conjunction with FIGS. 4A-4C. In FIG. 4A, the row parity check signal $\overline{RPC_i}$ is replaced by $\overline{RPC_iO}$ or $\overline{RPC_iE}$ respectively depending upon whether a word is being read from an odd or an even column. Similarly in FIGS. 4B and 4C, signal $\overline{RPC_{X+1}}$ is replaced by $\overline{RPC_{X+1}O}$ or $\overline{RPC_{X+1}E}$ depending upon whether a word at an odd or an even column is being read. Also in FIG. 4C, signal $\overline{CPC_2}$ is replaced by signal $\overline{CPC_2O}$ or signal $\overline{CPC_2E}$ depending upon whether a word at an odd or an even column is being read.

Several preferred embodiments of the invention have now been described in detail. And in view of this description, it should be apparent that various modifications may be made to those details without departing from the nature and spirit of the invention.

For example, several memory cells may be added to each of the rows in the arrays $A_1$-$A_X$ for storing any error-correcting code that is computed from the data bits in the corresponding row. Checker circuitry would then connect to all of the columns in an array for both detecting and correcting an error in a row of data bits when any one of those data bits is read as part of a data word.

As still another modification, the error detection and correction mechanisms that have been described above can be incorporated into any semiconductor chip that is only partly a memory chip. For example, the memory of FIG. 3 and 4 can be incorporated into a microprocessor chip as the control memory for storing the processor's microcommands.

Accordingly, since many such modifications for the above details are possible, it is to be understood that the invention is not limited to said details but is defined by the appended claims.

What is claimed is:

1. A high-speed low-overhead error-correcting memory comprising:

a plurality of data arrays of memory cells, said cells in each data array being arranged in M rows and N columns, with M and N being positive integers;

an additional memory cell in every row of each of said data arrays for storing a parity bit computed from the N data bits of the corresponding row;

a parity array of memory cells arranged in M rows and N columns for storing a parity bit at each row-column pair computed from the data bits in all of said data arrays at the corresponding row-column pair;

reading means coupled to all of said data arrays and said parity array for reading in parallel in a single cycle every memory cell in a selectable row of all of said data arrays and said parity array;

a plurality of first checking means corresponding in number to said plurality of data arrays, each of said first checking means being coupled to check parity on all of the bits read from said selectable row in a respective one of said data arrays;

a second checking means coupled to a selectable column of all of said data arrays and said parity array for checking parity of the bits therein as read by said reading means, said second checking means and said plurality of first checking means all operating simultaneously;

means for concatenating the bits as read by said reading means from said selectable column of all of said data arrays to form a data word; and means for inverting the kth bit of said data word if the first checking means for the kth data array and the second checking means both indicate an error.

2. A memory according to claim 1 wherein said means for reading includes a plurality of sense amplifiers which correspond in number and are coupled respectively to said columns of memory cells of all of said arrays, each sense amplifier being adapted to read the cell in its column which is at said selected row, and wherein each checking means of said first plurality is coupled to all of the sense amplifiers of a respective array to receive the read bits therefrom in parallel.

3. A memory according to claim 2 wherein said means for inverting includes a plurality of logic gates that correspond in number to said plurality of data arrays, each gate being coupled to receive in parallel with the other gates a first logic signal from a respective one of said first checking means and also receive a second logic signal from said second checking means and being adapted to perform an exclusive OR operation to invert a respective bit of said data word if said first and second logic signals are both true.

4. A memory according to claim 3 wherein said memory cells are electrically writable.

5. A memory according to claim 3 wherein said memory cells are mask programmable.

6. A memory according to claim 3 wherein said memory cells are dynamic cells.

7. A memory according to claim 3 wherein said memory cells are static cells.

8. A memory according to claim 3 wherein said parity bits are even parity bits.

9. A memory according to claim 3 wherein said parity bits are odd parity bits.

* * * * *